United States Patent
Stryffeler

(10) Patent No.: US 11,655,833 B1
(45) Date of Patent: May 23, 2023

(54) VARIABLE OUTPUT CYLINDER ASSEMBLY AND METHOD OF USE

(71) Applicant: Adam Stryffeler, Texarkana, AR (US)

(72) Inventor: Adam Stryffeler, Texarkana, AR (US)

(*) Notice: Subject to any disclaimer, the term of this patent is extended or adjusted under 35 U.S.C. 154(b) by 62 days.

(21) Appl. No.: 15/926,573

(22) Filed: Mar. 20, 2018

Related U.S. Application Data

(60) Provisional application No. 62/473,655, filed on Mar. 20, 2017.

(51) Int. Cl.
| | | |
|---|---|---|
| *F15B 15/10* | (2006.01) | |
| *B60T 11/08* | (2006.01) | |
| *F16J 3/06* | (2006.01) | |
| *F16J 3/02* | (2006.01) | |

(52) U.S. Cl.
CPC .............. *F15B 15/10* (2013.01); *B60T 11/08* (2013.01); *F16J 3/02* (2013.01); *F16J 3/06* (2013.01)

(58) Field of Classification Search
CPC ...... F16J 3/06; F16J 3/02; B60T 11/08; F04B 39/04; F15B 15/10
USPC .............................................................. 92/99
See application file for complete search history.

(56) References Cited

U.S. PATENT DOCUMENTS

| | | | | |
|---|---|---|---|---|
| 1,077,472 A | * | 11/1913 | Hofmann ............... | B60G 11/27 267/64.24 |
| 2,478,575 A | * | 8/1949 | Fitch ..................... | B60T 17/081 92/94 |
| 2,578,730 A | * | 12/1951 | Nicholson .................. | F16J 3/02 92/100 |
| 2,859,055 A | * | 11/1958 | Hupp .................... | F16J 15/3224 277/505 |
| 2,939,485 A | * | 6/1960 | Nauheimer ............. | F15B 15/10 92/99 |
| 2,950,739 A | * | 8/1960 | Lofink ................ | F16K 31/1262 92/95 |
| 3,039,127 A | * | 6/1962 | Molenaar ................ | B60S 1/482 15/250.02 |
| 3,227,093 A | * | 1/1966 | Taplin ........................ | F16J 3/06 92/80 |
| 3,309,967 A | * | 3/1967 | Taplin ........................ | F16J 3/06 92/101 |

(Continued)

*Primary Examiner* — Dustin T Nguyen
(74) *Attorney, Agent, or Firm* — Leavitt Eldredge Law Firm

(57) ABSTRACT

A variable output cylinder system includes a housing forming an inner cavity, the housing having a centerline co-axially extending through center of the inner cavity, and a first section secured to a second section, the first section having a sidewall the tapers outwardly relative to the centerline and relative to an opening passing through a thickness of the first section; a piston rod extending through and slidingly engaged with the opening; a piston head rigidly attached to an end of the piston rod; a pliable membrane fixedly secured to an outer surface of the piston head, the pliable membrane forming a sealed chamber within the second section, the pliably membrane forming an area disposed between the of the first section and an outer surface of the piston head; and a second opening extending through a thickness of the second section and configured to provide passage to the sealed chamber. The area disposed between the first section and the outer surface of the piston head increases in size as the piston traverses away from the opening of the first section.

2 Claims, 6 Drawing Sheets

(56) References Cited

U.S. PATENT DOCUMENTS

| | | | | |
|---|---|---|---|---|
| 3,311,028 A * | 3/1967 | Taplin | F15B 15/10 | |
| | | | 92/99 | |
| 3,321,823 A * | 5/1967 | Taplin | B29C 66/721 | |
| | | | 29/888.022 | |
| 3,339,464 A * | 9/1967 | Rietdijk | F25B 9/06 | |
| | | | 92/98 D | |
| 3,375,759 A * | 4/1968 | Smith | F16J 3/06 | |
| | | | 92/98 D | |
| 3,386,345 A * | 6/1968 | Taplin | F04B 39/044 | |
| | | | 92/99 | |
| 3,402,792 A * | 9/1968 | Masser | B60T 13/261 | |
| | | | 188/170 | |
| 3,744,381 A * | 7/1973 | Travaglio | F01B 17/00 | |
| | | | 92/161 | |
| 4,054,054 A * | 10/1977 | Minks | G01F 3/20 | |
| | | | 73/114.41 | |
| 4,193,337 A * | 3/1980 | Disdier | F01B 3/04 | |
| | | | 74/99 R | |
| 4,569,378 A * | 2/1986 | Bergandy | B65B 3/32 | |
| | | | 141/129 | |
| 4,597,859 A * | 7/1986 | Beck | B04C 11/00 | |
| | | | 209/155 | |
| 4,728,317 A * | 3/1988 | Martz | F02B 67/06 | |
| | | | 188/298 | |
| 4,741,252 A * | 5/1988 | Harter | F16J 3/06 | |
| | | | 92/102 | |
| 4,774,874 A * | 10/1988 | Adahan | F01B 29/04 | |
| | | | 92/128 | |
| 5,133,187 A * | 7/1992 | Beaudreault | D21F 1/40 | |
| | | | 226/191 | |
| 5,407,092 A * | 4/1995 | Hardgrave | F02K 9/50 | |
| | | | 220/590 | |
| 6,360,649 B1 * | 3/2002 | Plantan | B60T 17/083 | |
| | | | 92/99 | |
| 6,626,083 B2 * | 9/2003 | Bowyer | B60T 17/083 | |
| | | | 92/63 | |
| 6,662,708 B2 * | 12/2003 | Hosny | F01B 17/00 | |
| | | | 92/101 | |
| 6,722,262 B2 * | 4/2004 | Ball | F15B 15/10 | |
| | | | 92/103 F | |
| 7,077,611 B2 * | 7/2006 | Metschke | F15B 15/10 | |
| | | | 277/634 | |
| 8,449,265 B2 * | 5/2013 | Marica | F04B 9/1035 | |
| | | | 417/215 | |
| 8,664,947 B2 * | 3/2014 | Storrie | G01B 7/14 | |
| | | | 324/207.24 | |
| 9,435,630 B2 * | 9/2016 | Storrie | F15B 15/10 | |
| 10,077,850 B2 * | 9/2018 | Howell | F16K 31/1221 | |
| 10,197,074 B2 * | 2/2019 | Matsui | F15B 15/10 | |
| 2004/0250678 A1 * | 12/2004 | Bonotto | F15B 15/10 | |
| | | | 92/5 R | |
| 2005/0061144 A1 * | 3/2005 | Schall | F15B 15/10 | |
| | | | 92/98 D | |
| 2007/0240564 A1 * | 10/2007 | Uehara | F04B 43/0054 | |
| | | | 92/99 | |
| 2007/0257219 A1 * | 11/2007 | Perrin | F02B 39/00 | |
| | | | 251/61.5 | |
| 2009/0140730 A1 * | 6/2009 | Newman | G01D 5/145 | |
| | | | 324/207.24 | |
| 2010/0108929 A1 * | 5/2010 | Helfer | F16K 31/1655 | |
| | | | 251/231 | |
| 2011/0001070 A1 * | 1/2011 | Wilke | F16K 31/1262 | |
| | | | 251/129.03 | |
| 2012/0073432 A1 * | 3/2012 | Ingersoll | F04B 43/0054 | |
| | | | 92/99 | |
| 2013/0239799 A1 * | 9/2013 | Bradford | B60T 17/086 | |
| | | | 92/63 | |
| 2015/0233489 A1 * | 8/2015 | Gossett | F16K 31/126 | |
| | | | 251/63.6 | |
| 2018/0231082 A1 * | 8/2018 | Gaufin | F16D 65/28 | |

\* cited by examiner

VARIABLE OUTPUT CYLINDER ASSEMBLY AND METHOD OF USE

BACKGROUND

1. Field of the Invention

The present invention relates generally to variable output cylinders, and exemplified by a variable brake assembly and method of use for rail cars.

2. Description of Related Art

Brake assemblies are well known in the art and are effective means to stop a moving vehicle. In one embodiment, brake assemblies for railcars utilize fluid or air brake assemblies having one or more pistons utilized in the process of slowing down and eventually stopping the railcar during transit.

Although great strides have been made in the area of railcar brake assemblies, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
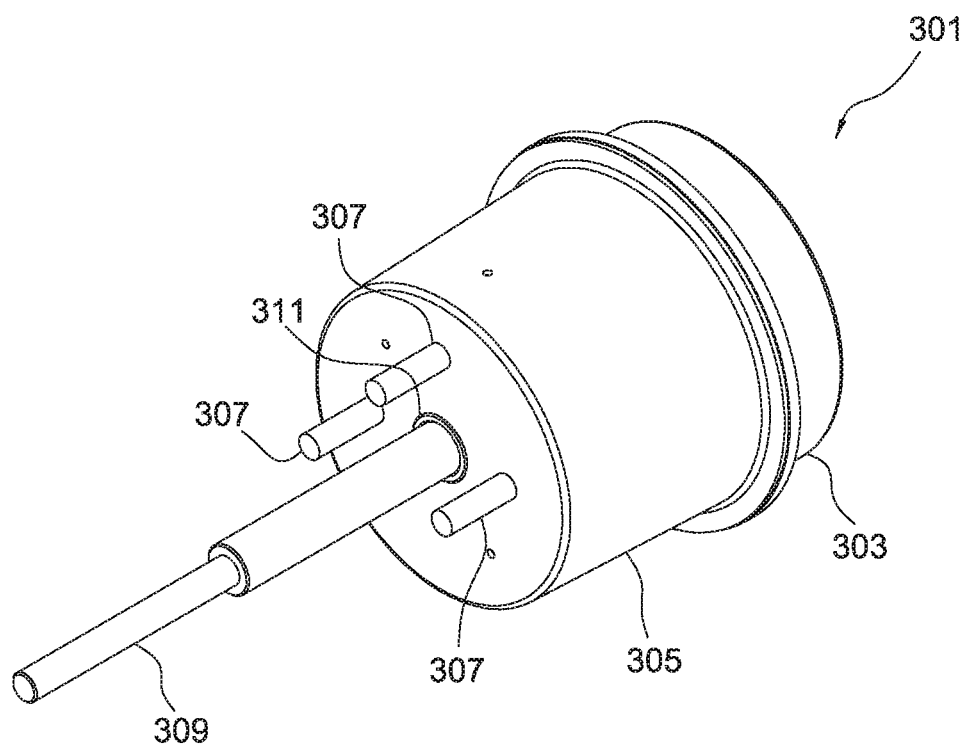
FIG. 1 is an oblique view of a railcar brake system in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-3B depict various views of a brake cylinder system 301 in accordance with a preferred embodiment of the present application. It will be appreciated that system 301 overcomes one or more problems commonly associated with conventional brake systems.

In the preferred embodiments, the systems discussed herein are utilized with railcars; however, it will be appreciated that the features disclosed could be utilized with other types of vehicles and should not be narrowly tailored to protect only railcar brakes.

In the contemplated embodiment, system 301 includes one or more of a housing having a first section 303 secured to a second section 305 to form an inner cavity therein. a plurality of attachment devices 307 fixedly engage with second section 305, which in turn are configured to engage with a structure of the railcar (not shown) for securing system 301 in a fixed position. Section 305 includes an opening wherein a piston rod 309 slidingly engages therethrough in a direction indicated by arrow 409.

A piston head 403 is rigidly attached to rod 309 and engages with a spring 419 configured to wrap around the outer periphery of the rod and configured to push the piston head 403 in a direction away from the opening of section 305. Air, gas, and/or fluid passes through a second opening 417 extending through section 303. An attachment device 405 is secured to section 303 and configured to engage with a brake assembly (not shown).

Figure 3A:
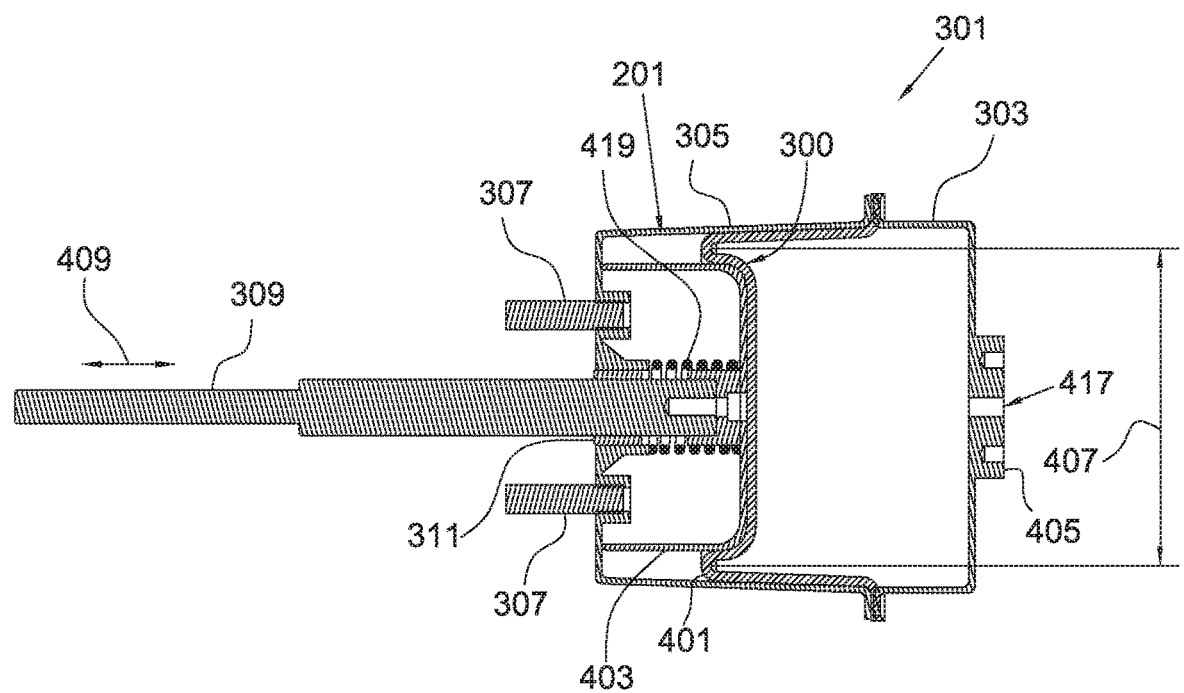
FIGS. 3A and 3B are side cross-sectional views of the system of FIG. 1.
Figure 3B:
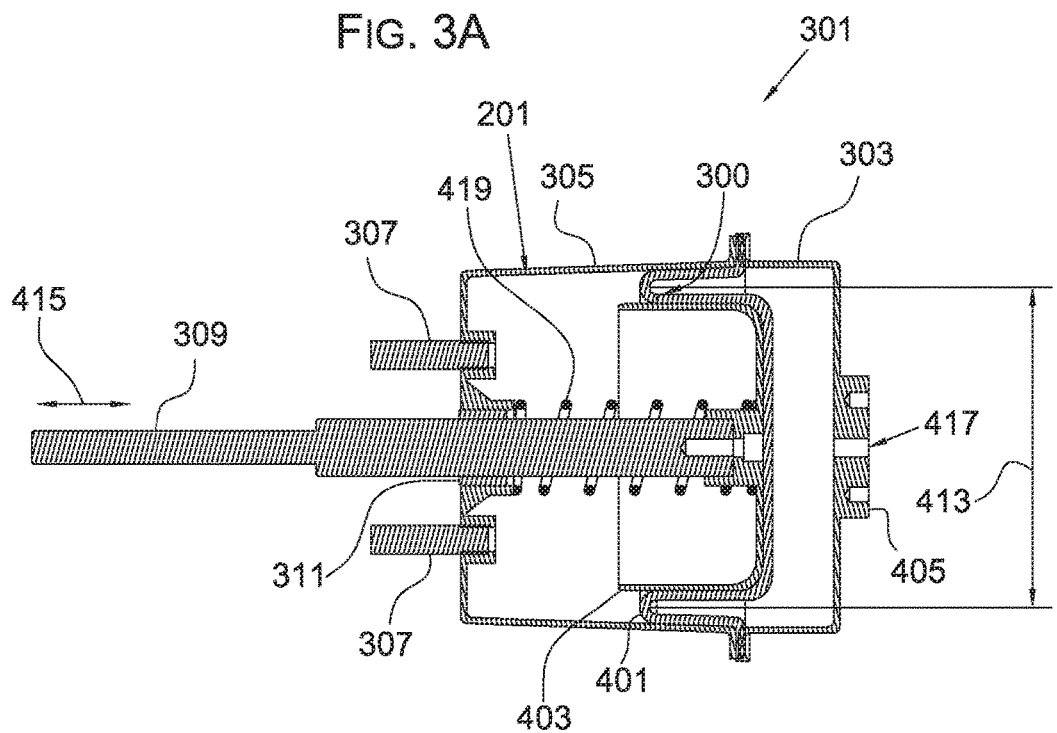
Figure 4:
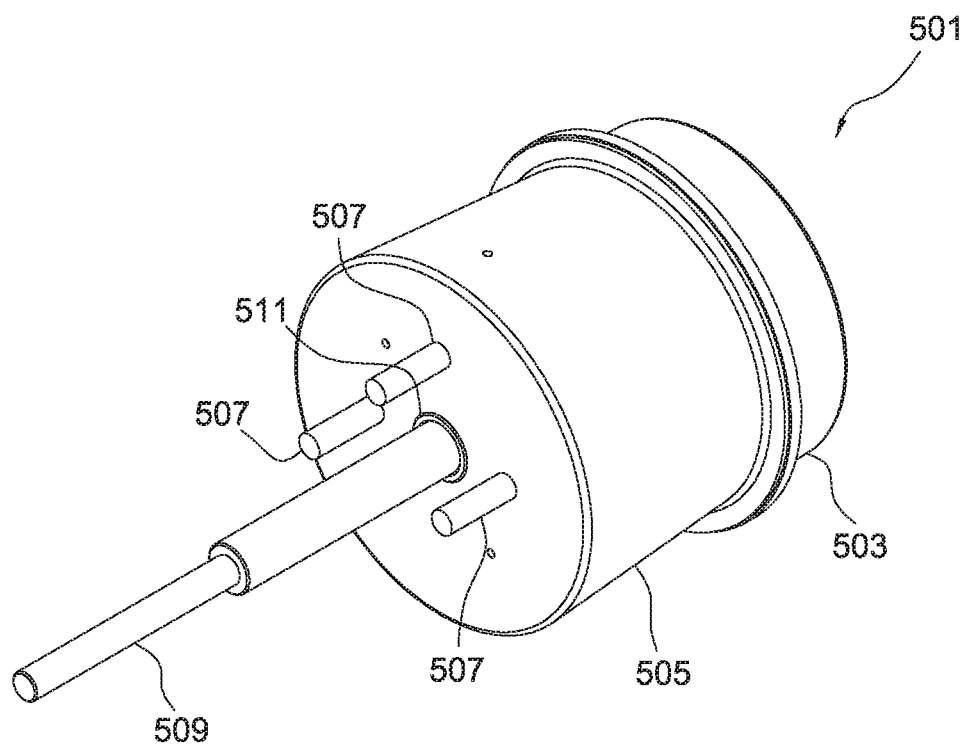
FIG. 4 is an oblique view of a railcar brake system in accordance with an alternative embodiment of the present invention.

In the contemplated embodiment, the assemblies discussed herein utilizes a one-way cylinder concept. Air pressure is inserted at 417 and the air pressure times the 413 and 407 cross-sectional areas produce force to extend piston rod 309 away from the cylinder body (FIG. 3A). As shown 413 relates to a larger cross-sectional area than 407. Therefore, force 415 (to the left as shown) is greater than the force 409. This reduced change in output force from 413 to 407 is the variable feature of the invention. When the air pressure is removed the spring 419 forces the piston from the position of 3A to 3B. FIGS. 3A & 3B show a reduced output force with the extension of the rod 309 with the air pressure constant.

A pliable membrane 401 is fixedly secured to the piston head 403 and is sandwiched between an area disposed between sections 303, 305 as shown in the drawings. In one embodiment, the pliable membrane 401 is composed of a reinforced rubber material; however, it should be appreciated that other types of pliable materials could be utilized in alternative embodiments.

Figure 2:
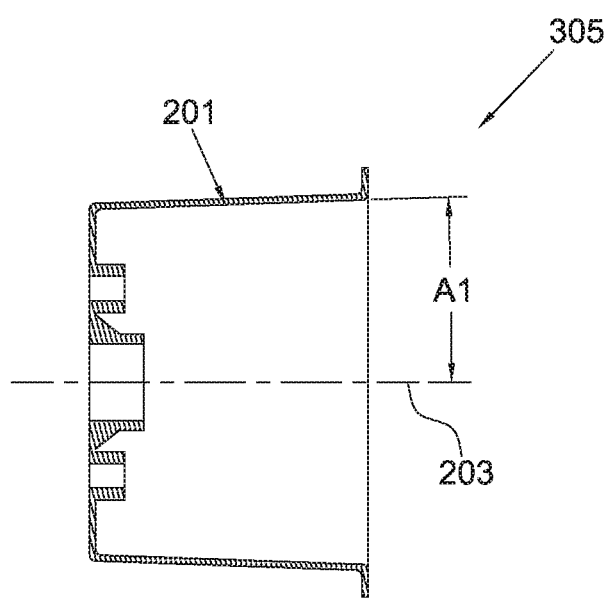
FIG. 2 is a side cross-sectional view of the housing of the system of FIG. 1.

The pliable membrane 401 forms an area 300 disposed between the piston head and the side of section 305. As depicted, the area 300 decreases in size as the piston rod 309 and head 403 traverse in direction 415 (from 3B to 3A). This feature is achieved by providing a section 305 having an inner surface 201 that gradually extends inwardly, as indicated by arrow A1, relative to the centerline 203 and relative to the opening that the piston rod extends therethrough. These features are depicted in FIG. 2, where the center of the opening 300 are depicted by arrows 407, 413 in respective FIGS. 3A and 3B, wherein arrow 407 has a lesser length than arrow 413.

In an alternative embodiment, system 501 includes one or more of a housing having a first section 503 secured to a second section 505 to form an inner cavity therein. a plurality of attachment devices 507 fixedly engage with second section 505, which in turn are configured to engage with a structure of the railcar (not shown) for securing system 501 in a fixed position. Section 505 includes an opening wherein a piston rod 509 slidingly engages therethrough in a direction indicated by arrow 609.

A piston head 603 is rigidly attached to rod 509 and engages with a spring 619 configured to wrap around the outer periphery of the rod and configured to push the piston head 603 in a direction away from the opening of section 505. Air, gas, and/or fluid passes through a second opening 617 extending through section 503. An attachment device 605 is secured to section 503 and configured to engage with a brake assembly (not shown).

A pliable membrane 601 fixedly secures to the piston head 603 and is sandwiched between an area disposed between sections 503, 505 as shown in the drawings. In one embodiment, the pliable membrane 601 is composed of a reinforced rubber material; however, it should be appreciated that other types of pliable materials could be utilized in alternative embodiments.

Figure 5:
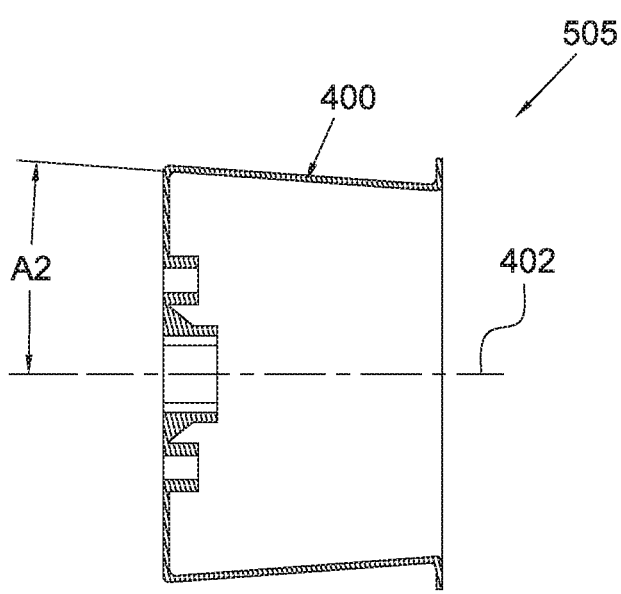
FIG. 5 is a side cross-sectional view of the housing of the system of FIG. 4.

The pliable membrane 601 forms an area 600 disposed between the piston head and the side of section 505. As depicted, the area 600 decreases in size as the piston rod 509 and head 603 traverse in direction 615. This feature is achieved by providing a section 505 having an inner surface 400 that gradually decreases, as indicated by arrow A2, relative to the centerline 402 and relative to the opening that the piston rod extends therethrough. These features are depicted in FIG. 5, where center of the opening 600 are depicted by arrows 607, 613 in respective FIGS. 6A and 6B, wherein arrow 607 has a greater length than arrow 613.

Figure 6A:
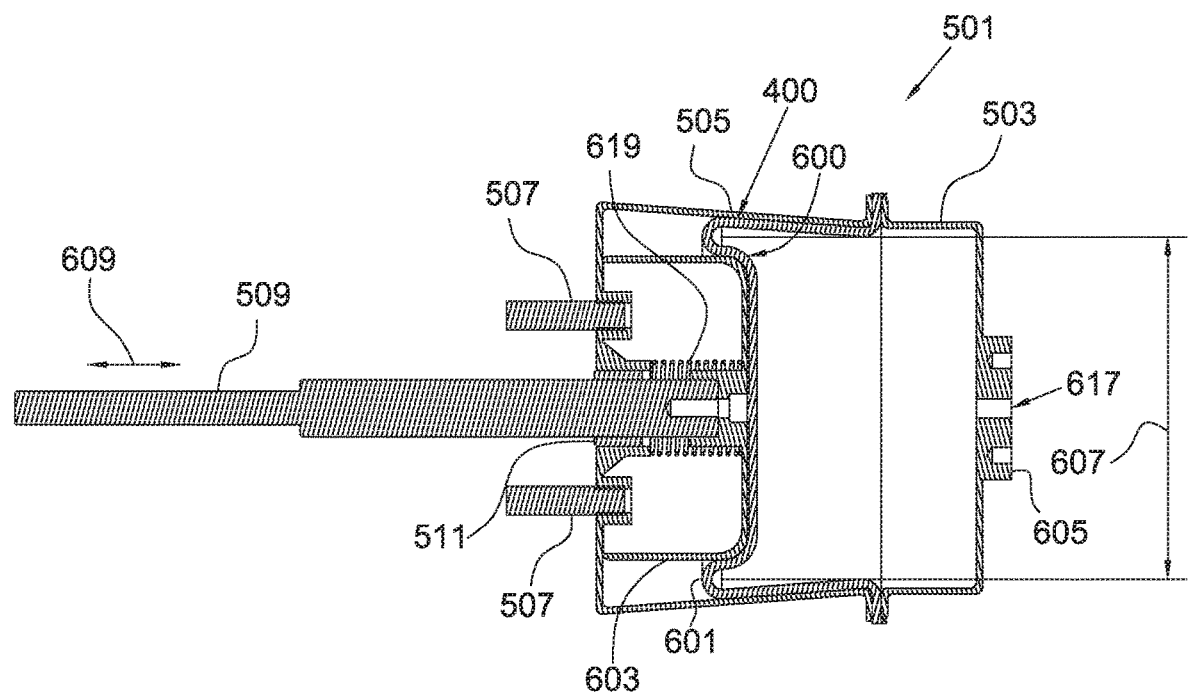
FIGS. 6A and 6B are side cross-sectional views of the system of FIG. 4.
Figure 6B:
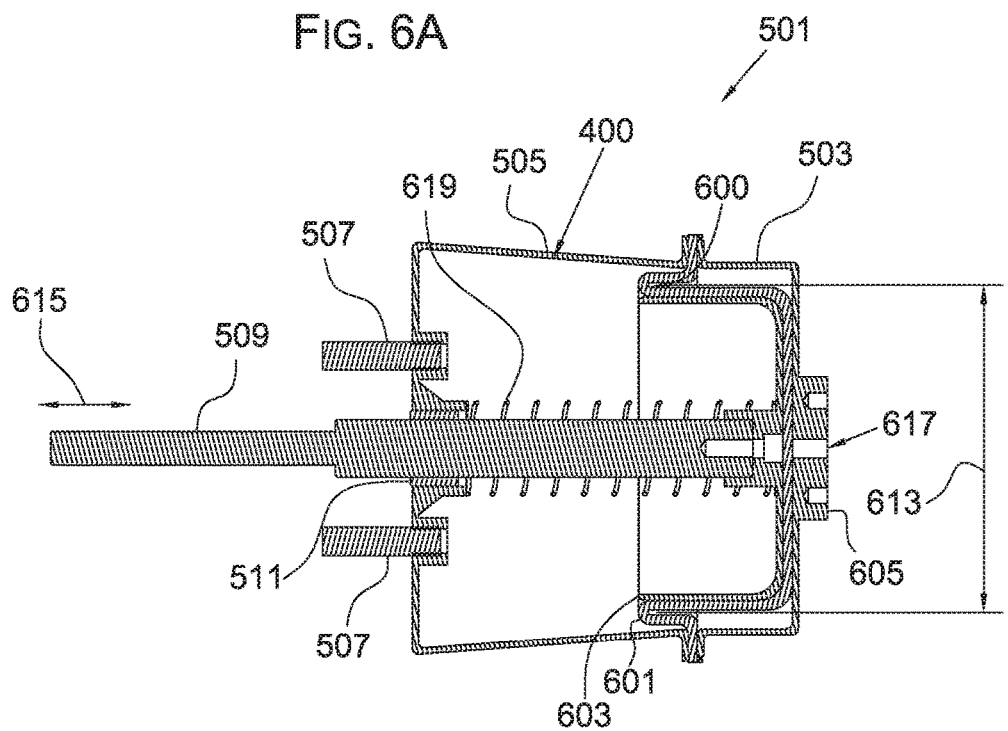
Figure 7:
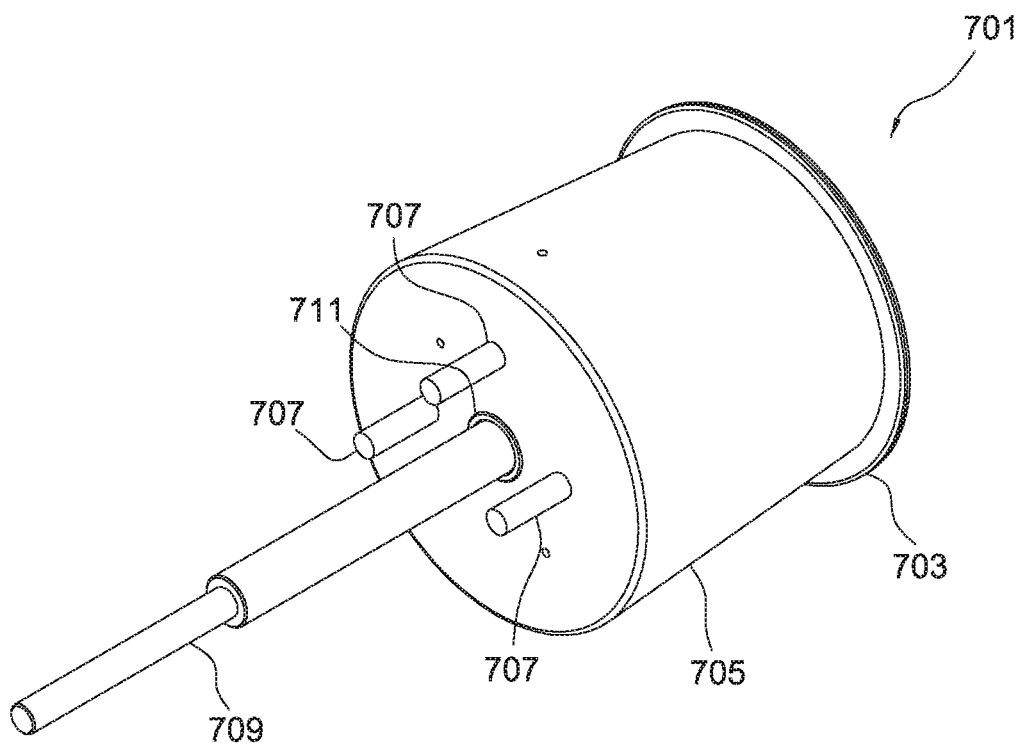
FIG. 7 is an oblique view of a railcar brake system in accordance with an alternative embodiment of the present invention.

In the contemplated embodiments, FIGS. 6A and 6B are representative of rail car use. When rail car brakes are applied a constant volume of pressurized air is released to the cylinder from an air reservoir. As the cylinder advances the total volume (reservoir+piping+cylinder volume) increases with no added air. Therefore, the psi is reduced, the force on the piston is reduced, and ultimately the applied braking force is reduced—not a good thing. In order to specify the correct braking force engineers calculate the effective force atone position for the cylinder rod. For example for a 10 inch long cylinder the piston position would be established at 5 inches of extension. The 5 inches would be needed to take the slack and deflections out of the brake lever system in order to apply the designed force to the brakes. Then the volume of the cylinder at 5 inches is added to the volume of the reservoir and piping to determine the "equalized" piston rod applied force. If the piston travel is less than 5 inches when the system "equalizes" the brake force is too high. If the piston travel 9 inches, for example, the system volume is large and the "equalized" braking force is reduced. Currently the range for correct piston travel is about 5" +/−½". It is and always has been difficult and expensive to maintain a +/−½" range.

It should be understood that as the rod 509 extends the cross-sectional area 613 increases to 607 while the equalized air pressure at 617 decreases. If the equalized air pressure drops 10% when the piston 603 advances from 6B to 6A and the cross-sectional area from 613 to 607 increases by 10% the braking force is constant for the full stroke. Therefore, the acceptable service travel limits can be increased from +/−½" to the full travel of the cylinder rod. If "equalization" is reduced or eliminated, there will be a major impact for improved braking at a very reduced maintenance cost.

In an alternative embodiment, system 701 includes one or more of a housing having a first section 703 secured to a second section 705 to form an inner cavity therein. a plurality of attachment devices 707 fixedly engage with second section 705, which in turn are configured to engage with a structure of the railcar (not shown) for securing system 701 in a fixed position. Section 705 includes an opening wherein a piston rod 709 slidingly engages therethrough in a direction indicated by arrow 809.

A piston head 703 is rigidly attached to rod 709 and engages with a spring 819 configured to wrap around the outer periphery of the rod and configured to push the piston head 803 in a direction away from the opening of section 705. Air, gas, and/or fluid passes through a second opening 817 extending through section 703. An attachment device 805 is secured to section 703 and configured to engage with a brake assembly (not shown).

A pliable membrane 801 fixedly secures solely to the piston head 803 as shown in the drawings. In one embodiment, the pliable membrane 801 is composed of a reinforced rubber material; however, it should be appreciated that other types of pliable materials could be utilized in alternative embodiments.

Figure 8:
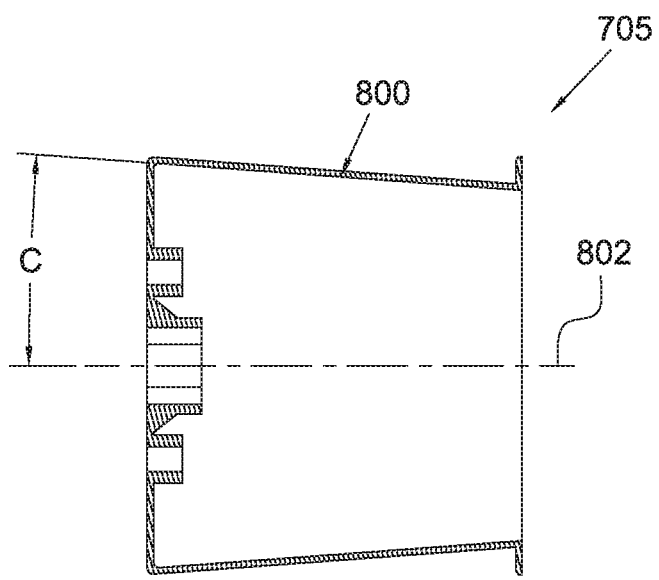
FIG. 8 is a side cross-sectional view of the housing of the system of FIG. 4.
Figure 9A:
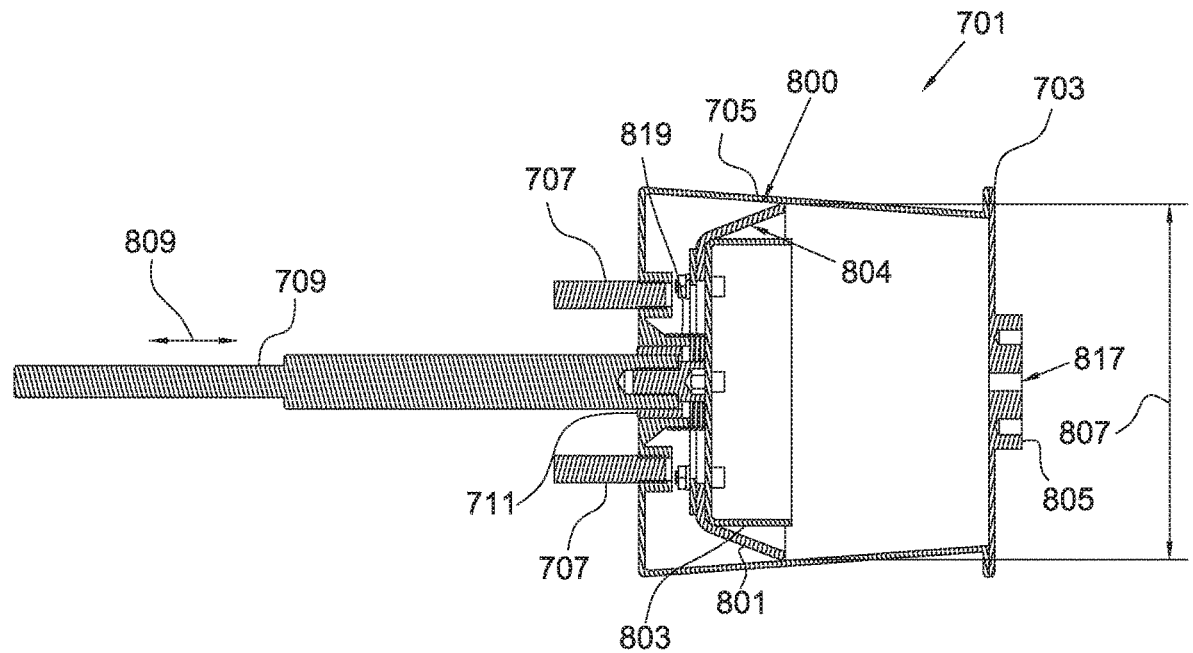
FIGS. 9A and 9B are side cross-sectional views of the system of FIG. 4.
Figure 9B:
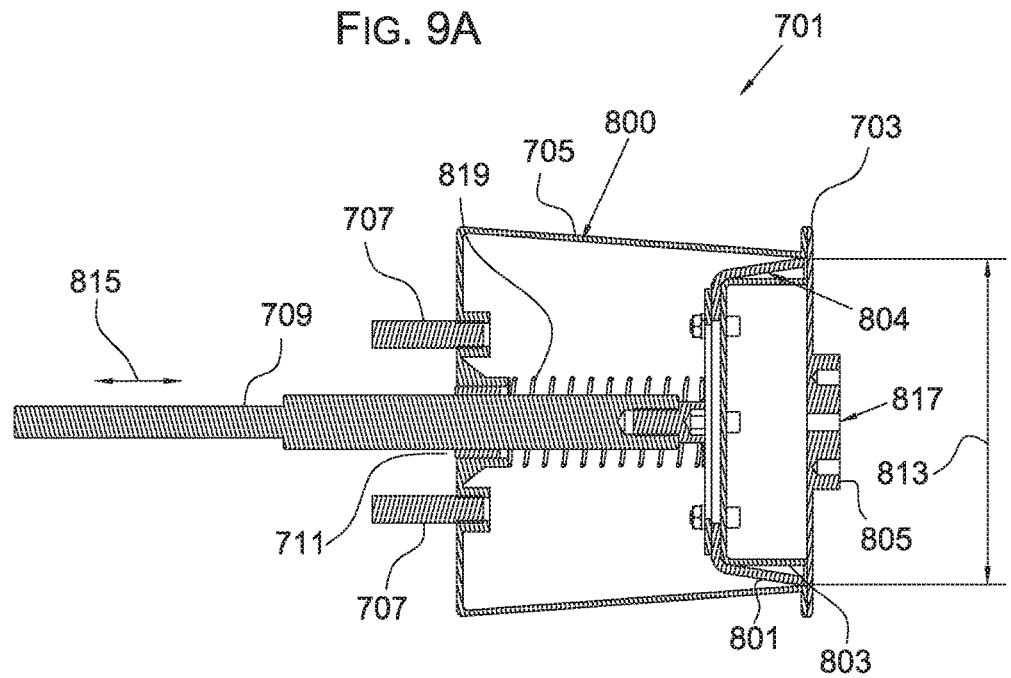

The pliable membrane 801 forms an area 800 that decreases in size as the piston rod 709 and head 803 traverse in direction 815. This feature is achieved by providing a section 705 having an inner surface 804 that gradually decreases, as indicated by arrow C, relative to the centerline 802 and relative to the opening that the piston rod extends therethrough. These features are depicted in FIG. 8, where the center of the opening 804 are depicted by arrows 807, 813 in respective FIGS. 9A and 9B, wherein arrow 807 has a greater length than arrow 813.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A variable output cylinder system, comprising:
a housing forming an inner cavity, the housing having:
   a first section secured to a second section, the first section having a constant diameter circumferential wall that is consistent throughout a length of the first section and the first section further including a radially extending inner surface;
the second section having a tapered circumferential wall such that a diameter of the tapered circumferential wall of the second section becomes continuously smaller towards the first section;
wherein the constant diameter circumferential wall is positioned between an opening extending through the radially extending inner surface of the first section and the tapered circumferential wall;
a plurality of attachment devices extending from an end of the second section;
a piston rod extending through and slidingly engaged within the opening of the second section;
a piston head rigidly attached to an end of the piston rod, the piston head having an outer surface that extends parallel to the radially extending inner surface of the first section, the piston head forming a hollow inner area, the hollow area extending outwardly past the plurality of attachment devices;
a spring wrapped around the piston rod and extending within the hollow inner area of the piston head, the spring having a diameter less than a distance between the plurality of attachment devices;
a pliable membrane fixedly secured to the outer surface of the piston head, the pliable membrane partially sandwiched and overlaps within an area disposed between the first section and the second section and the outer surface of the piston head; and
wherein the area disposed between the first section and the outer surface of the piston head decreases in size as the piston moves from the second section to the first section.

2. The system of claim 1, wherein a peripheral edge of the pliable membrane is sandwiched between the first section and the second section.

* * * * *